US006359797B1

United States Patent
Bayer et al.

(10) Patent No.: US 6,359,797 B1
(45) Date of Patent: Mar. 19, 2002

(54) DC/DC CONVERTER INCORPORATING A SKIP MODE REGULATOR

(75) Inventors: Erich Bayer, Thonhausen; Hans Schmeller, Falkenberg, both of (DE)

(73) Assignee: Texas Instruments Deutschland GmbH, Freising (DE)

( * ) Notice: Subject to any disclaimer, the term of this patent is extended or adjusted under 35 U.S.C. 154(b) by 0 days.

(21) Appl. No.: 09/610,276

(22) Filed: Jul. 6, 2000

(51) Int. Cl.[7] ............ H02M 3/18; H02M 7/00
(52) U.S. Cl. ............ 363/60; 363/59; 307/110
(58) Field of Search .......... 363/59, 60; 307/109, 307/110

(56) References Cited

U.S. PATENT DOCUMENTS

| 5,262,934 | A | * | 11/1993 | Price | ............ | 363/60 |
| 5,493,543 | A | * | 2/1996 | Kamens | ............ | 368/255 |
| 5,680,300 | A | * | 10/1997 | Szepesi | ............ | 363/59 |
| 5,757,632 | A | * | 5/1998 | Beppu et al. | ............ | 363/60 |
| 5,790,393 | A | * | 8/1998 | Fotoubi | ............ | 363/60 |

* cited by examiner

Primary Examiner—Peter S. Wong
Assistant Examiner—Bao Q Va
(74) Attorney, Agent, or Firm—William B. Kempler; Frederick J. Telecky, Jr.

(57) ABSTRACT

The invention relates to a DC/DC converter operating on the principle of a charge pump, comprising at least one charge pump capacitor and several controllable switches connected thereto. The switches are actuated by a control circuit with an oscillator. A skip mode comparator signals the charge pump alternatingly ON and OFF depending on the condition of the output voltage of the converter. Prior art converters featured high output current spikes and a heavy output voltage ripple. The converter in accordance with the invention reduces these problems by a regulator circuit which receives the control signal of the comparator and converts it into a signal characterizing the momentary ON/OFF duration ratio of the charge pump with which it controls the ON resistance of at least one of the switches so that the ON/OFF duration ratio of the charge pump can be set to a predetermined design value, at which the output current spikes of the charge pump are reduced. Provided parallel to this switch is a further small switch whose ON resistance is not controlled to thus ensure a small idle current of the charge pump at a low load.

18 Claims, 3 Drawing Sheets

DC/DC CONVERTER INCORPORATING A SKIP MODE REGULATOR

Figure 1:
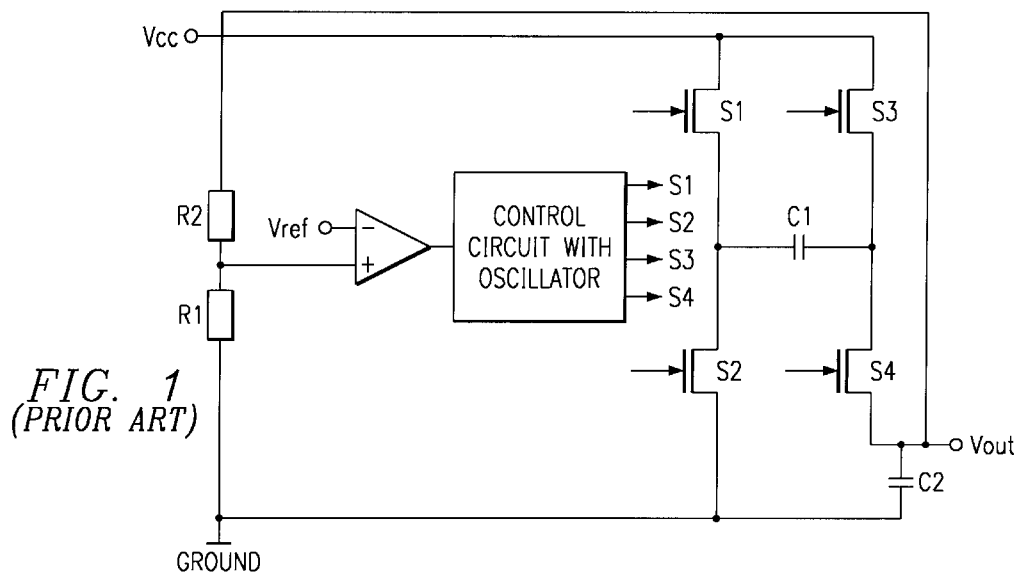

The invention relates to a DC/DC converter operating on the principle of a charge pump, comprising at least one charge pump capacitor and several controllable switches connected thereto which are actuated during charge pump operation by a control circuit with an oscillator to generate across a storage capacitor applied to the output of the converter an output voltage deviating from the input voltage of the converter and a comparator which compares a reference voltage to a voltage proportional to the output voltage of the converter and outputs a control signal for the control circuit, the control signal comprising a first level when the output voltage drops below a predetermined design value and comprising a second level when the output voltage exceeds the design value, the control circuit signalling the charge pump ON when the control signal changes from the second to the first level and signalling the charge pump OFF when the control signal changes from the first to the second level.

Many electronic circuits require in addition to the supply voltage further voltages sometimes at a level above that of the supply voltage. One low-cost, simple and with respect to converters employing a coil highly compact solution for making these further voltages available are DC/DC converters operating on the charge pump principle. Converters of this kind are described e.g. in the text book "The Art of Electronics" by Paul Horowitz, 2nd edition, Cambridge University Press, New York, 1991 on pages 377 to 379 thereof.

Horowitz also describes a simple DC/DC converter operating on the charge pump principle which may be employed for substantially doubling an input voltage. The basic circuit of the converter consists substantially of a charge pump capacitor and four controllable switches (e.g. MOSFETs), whereby one electrode of the charge pump capacitor is connectable via a first switch to the input voltage terminal of the converter and via the second switch to ground, and the other electrode of the capacitor is connectable via the third switch to the input voltage terminal and via the fourth switch to the output voltage terminal of the converter. The converter comprises further control circuit with a clock oscillator which signals the switches so that in a first phase of a clock cycle, the so-called charge phase, the second switch and the third switch are ON whilst the other switches are OFF so that the charge pump capacitor is charged to the input voltage, and in a second phase of a clock cycle, the so-called discharge phase, the first switch and the fourth switch are ON whilst the other switches are OFF so that the charged charge pump capacitor is then connected in series to the input voltage, resulting in a voltage value at a smoothing and storage capacitor located at the output of the circuit corresponding to roughly twice the input voltage.

Correspondingly, charge pumps are conceivable which generate any multiple of the input voltage, invert or reduce the input voltage.

In the DC/DC converter described, operating in accordance with the charge pump principle, the output voltage undesirably drops off sharply at even small load currents, however. Since in the majority of applications the output voltage, which e.g. in digital electronic circuits is often 3.3 or 5 V, is fixed and is allowed to fluctuate only in a tight range, regulated converters have been developed which set the output voltage to a fixed, desired voltage value.

The regulators of the DC/DC converters comprise as a rule a comparator which compares the actual output voltage or a voltage proportional to the actual output voltage (the proportional voltage being derived e.g. from the output voltage via a voltage divider) to a predetermined reference voltage representing the design output voltage and then, when a deviation is sensed, outputs a control signal, with the aid of which the actual output voltage is adapted to the predetermined design output voltage value.

Described in U.S. Pat. No. 5,680,300 are two types of regulators employing DC/DC converters operating on the charge pump principle, i.e. the so-called linear regulator and the so-called skip mode regulator.

In the linear regulator the control signal of the comparator changes, e.g. via a gate of one of the MOSFET switches, the ON resistance of the MOSFET so that the drop in voltage across the switch is increased or decreased, resulting in a reduction or increase in the actual output voltage. The linear regulator has, however, the drawback that the losses occurring on switching the charge pump switches are relatively large since the charge pump in the case of the linear regulator is always in operation; it thus being suitable only for relatively large load currents occurring continually.

These drawbacks do not occur in the so-called skip mode regulator since it uses the control signal of the comparator to signal the charge pump alternatingly ON/OFF so that a charge is pumped to a smoothing and storage capacitor located at the output of the circuit only when the voltage connected thereto has dropped below the design output voltage level. The skip mode regulator thus operates in a particularly energy-saving way and is especially suitable for applications in which sometimes small and sometimes large load currents may occur.

For illustration, FIG. 1 shows a prior art DC/DC converter incorporating a skip mode regulator which combines the cited Horowitz charge pump arrangement with the skip mode regulator as described in U.S. Pat. No. 5,680,300. One such converter is also described as type MAX679 in a product catalog of the Company Maxim Integrated Products available in May 1999 under the site address http://www.maxim-ic.com.

However, such existing converters incorporating a skip mode regulator have the drawback that the output current of the charge pump comprises relatively large current spikes during operation of the converter under normal load conditions. The reason for this is that the charge pump needs to be designed so that it is also capable of furnishing a predetermined minimum output current even when its working conditions deteriorate, for instance, due to a drop in the input voltage, an increase in temperature or poor process quality MOSFET switching transistors.

These high current spikes have several negative consequences, one of which e.g. is the relatively large dimensioning of the output capacitor. In addition, these current spikes result in high noise radiation. When the input voltage of the converter is furnished by a battery, e.g. a Li ion cell the high spike currents result in a reduction in the life of the battery. On top of this, a heavy ripple in the output voltage is produced by these high current spikes.

It is thus an object of the present invention to improve a DC/DC converter as cited at the outset operating on the charge pump principle so that the output current spikes of the charge pump and the output voltage ripple are greatly reduced.

This object is achieved by a DC/DC converter as cited at the outset which is characterized by a regulator circuit receiving the control signal of the comparator and converting it into a signal characterizing the momentary ON/OFF duration ratio of the charge pump with which it controls the ON resistance of one of the switches so that the ON/OFF duration ratio of the charge pump can be regulated to a predetermined design value, and by a further controllable switch connected in parallel with the switch whose ON resistance is controlled and which is controlled by the control circuit correspondingly thereto.

Figure 2A:
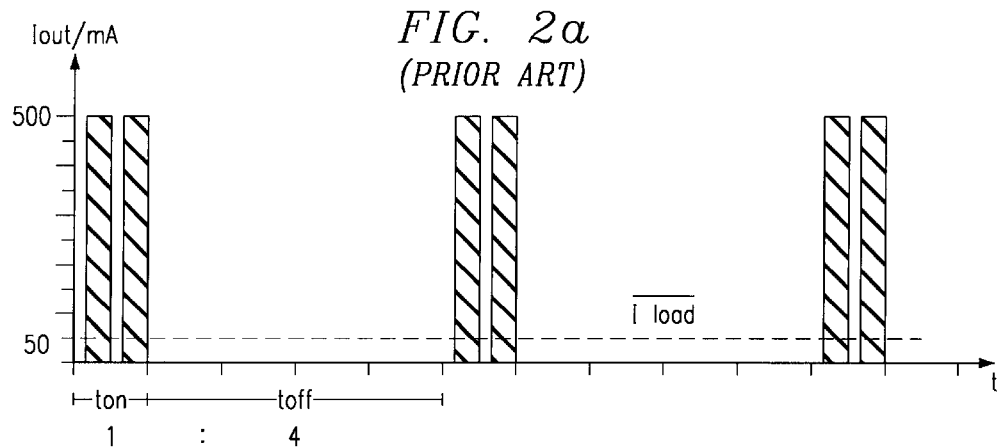
Figure 2B:
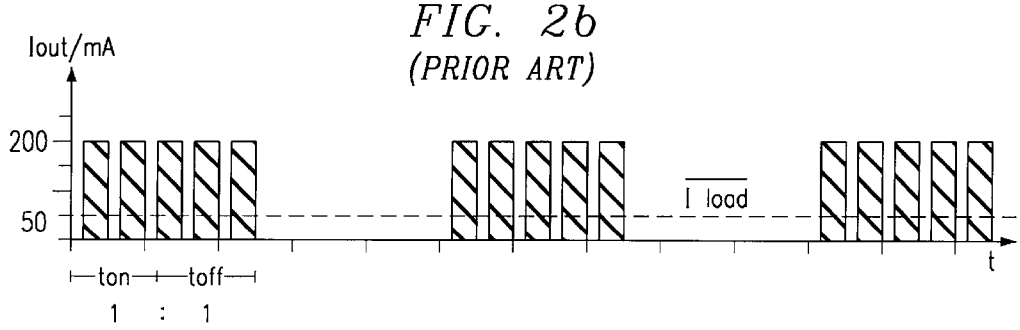
Figure 3:
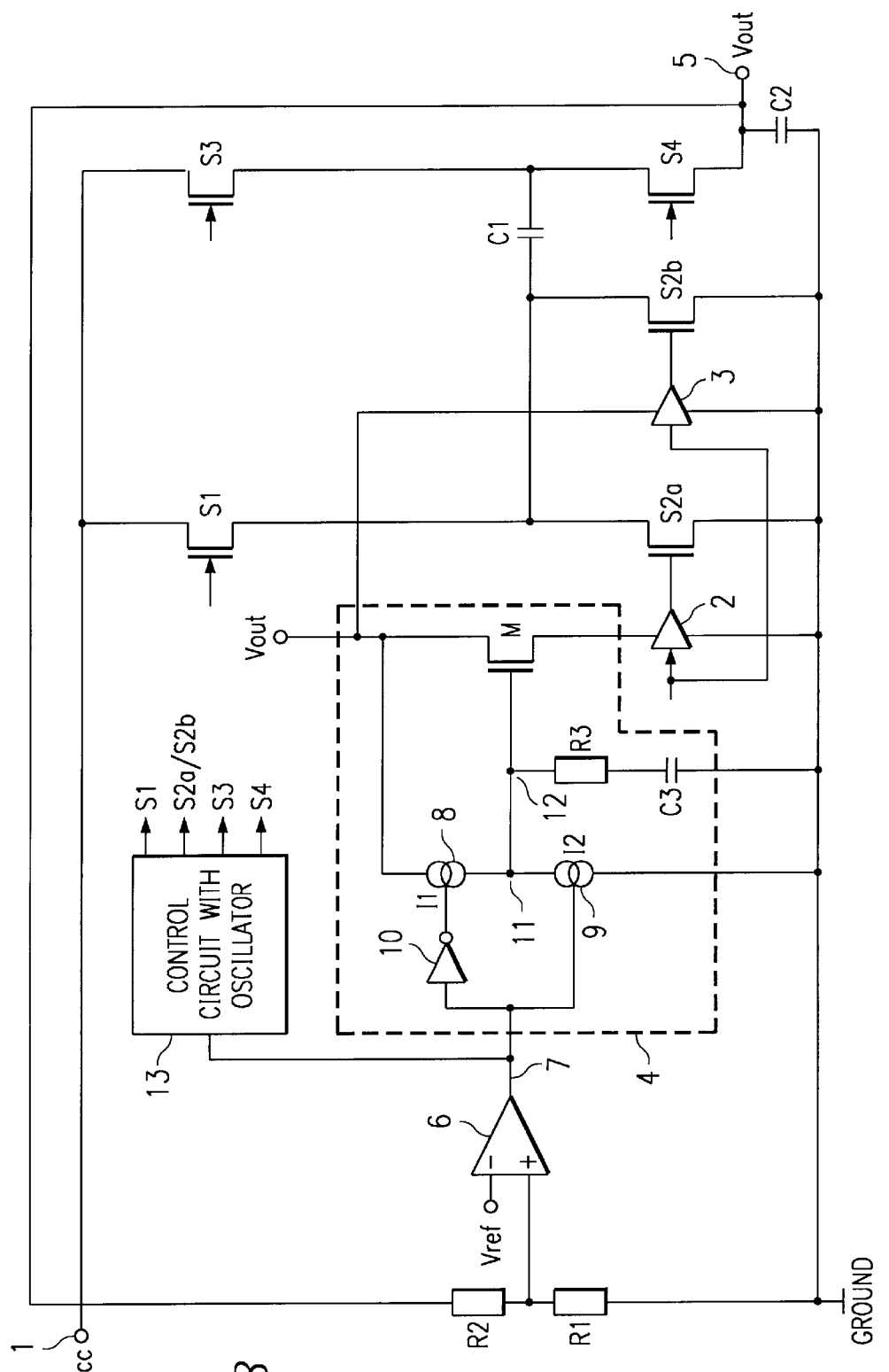

The invention will now be explained by way of example with reference to the drawings in which FIG. 1 is a circuit diagram of a prior art DC/DC converter operating on the charge pump principle incorporating a skip mode regulator;

FIGS. 2a and 2b are graphs illustrating how the output current of a prior art DC/DC converter operating on the charge pump principle reacts in time to normal conditions and to adverse conditions, in explaining the principle in accordance with the invention;

FIG. 3 a circuit diagram of one preferred embodiment of a DC/DC converter in accordance with the invention operating on the charge pump principle; and FIGS. 4a and 4b are graphs illustrating how the output current of a prior art DC/DC converter and of a DC/DC converter in accordance with the invention reacts in time to a change in the load.

Referring now to FIG. 1 there is illustrated the circuit diagram of a prior art DC/DC converter operating according to the charge pump principle as detailled in the background description and incorporating a skip mode regulator.

FIG. 2a illustrates in a prior art DC/DC converter as shown in FIG. 1, by way of example, the current spikes of the output current Iout of its charge pump under normal working conditions and in load operation.

In this arrangement it is assumed that the DC/DC converter is required to furnish an average load current Iload at the output of 50 mA as indicated by the broken line. This average load current is the current which the charge pump needs to furnish as a minimum in this concrete application. In the absence of a load the skip mode regulator will allow the charge pump to skip a few working cycles at the output so that during this time no current flows to the output capacitor C2 and no current spikes occur. When e.g. the minimum load of 50 mA is demanded at the output the charge pump is switched ON/OFF in a predetermined rhythm as evident from FIG. 2. The amplitude of the current spikes occurring during the ON duration ton of the charge pump is calculated from the following formula:

$$Ispike = 2 * Iload * (toff + ton)/ton \qquad (1)$$
$$= 2 * Iload * ((toff/ton) + 1)$$

where Ispike is the amplitude of the current spikes, ton is the ON duration of the charge pump and toff is the OFF duration of the charge pump. Of course, it only makes sense to apply this formula when the charge pump is being operated under load and not running idle, since otherwise toff becomes "infinite". The formula shows that the amplitude of the current spikes depends only on the average load current and on the ON/OFF duration ratio of the charge pump. The factor 2 materializes from the fact that the charge pump is signalled alternatingly ON/OFF in operation so that it in actual fact furnishes a current to the output only during half of its ON duration.

As evident from FIG. 2 under normal working conditions, i.e. for a normal input voltage Vcc, "good" switching transistors and a normal operating temperature the ratio toff to ton is 4 to 1 resulting in a current spike amplitude of 2*50 mA*(4+1)=500 mA for an average load current of 50 mA.

Here, it has been assumed that the charge pump during the time in which it is ON due to the skip mode regulator is switched to and fro twice each time by the control circuit with the oscillator, i.e. cycling through charging phase, discharge phase, charging phase, discharge phase. In this arrangement a current is furnished to the output only during the discharge phases, this being indicated by the heavy black line, whereby, of course, this heavy line depiction of the current profile is idealized to make for a better appreciation, whereas in reality it will have a different profile depending on the quality of the components employed.

Under normal working conditions for conventional charge pumps the ratio of the ON duration to the OFF duration needs to be relatively large when operating under load so that the charge pump is still able to furnish the average minimum output current—i.e. 50 mA in our example—as called for by the particular application despite adverse working conditions e.g. with a reduction in the input voltage Vcc, poor quality transistors (e.g. having a poor slope due to the process involved) or due to elevated temperatures.

Referring now to FIG. 2b there is illustrated what the current spikes would look like under adverse working conditions. In this case, the charge pump ON/OFF duration ratio set by the skip mode regulator needs to be greater so as to furnish the same output current. One reason for this may be e.g. a reduced input voltage Vcc of the charge pump. In the selected example the ON/OFF duration ratio of the charge pump is 1 to 1 which results in reduced current spikes (Ispike=200 mA) and thus also results in less ripple of the output voltage of the converter as compared to the case under normal conditions.

It is here that the invention makes use of the fact that in conventional DC/DC converters having skip mode regulation under "adverse working conditions" benefits materialize as regards the amplitude of the output current spikes of the charge pump and in the output voltage ripple of the charge pump by it, as a rule, attempting to make "adverse working conditions" the normal case and to regulate the ON/OFF duration ratio of the charge pump of the DC/DC converter independent of the working conditions to a favorable value at which the output current spikes and the output voltage ripple are greatly reduced as compared to conventional converters.

Referring now to FIG. 3 there is illustrated a DC/DC converter in accordance with the invention which is configured similar to the prior art DC/DC converter as shown in FIG. 1.

The DC/DC converter in accordance with the invention comprises a charge pump capacitor C1, the one electrode of which is connected via a first MOSFET switch S1 to the input 1 of the converter, to which an input DC voltage Vcc is applied.

The MOSFET switch S2 provided in the prior art converter as shown in FIG. 1 which connects one electrode of the charge pump capacitor C1 to ground is replaced by two MOSFET switches S2a and S2b connected in parallel in the converter in accordance with the invention. Likewise evident from FIG. 3 are the two gate drivers 2 and 3 of the MOSFET switches S2a and S2b, the supply voltage of the gate driver of the switch S2a being controlled via the regulator circuit 4 windowed by the broken line and which will be discussed later, whilst the supply voltage of the gate driver of the switch S2b is non-controlled and corresponds to the output voltage Vout of the converter. In this arrangement the surface area of the MOSFET switch Sa which is integrated in the preferred production of the circuit is larger than that of the MOSFET switch S2*b* by a factor N which may be e.g. of the order 30.

The other electrode of the charge pump capacitor C1 is—the same as in the prior art converter as shown in FIG. 1—connected via MOSFET switch S3 to the input 1 of the converter and via a fourth MOSFET switch S4 to the output 5 of the converter. All switches of the charge pump, i.e. including also the switches S1, S3 and S4 should comprise gate drivers which are not shown in FIG. 3 for the sake of an uncluttered illustration. The switches S1, S3 and S4 comprise in the selected example depletion mode P-type MOSFETS, whilst S2*a* and S2*b* are depletion mode N-type MOSFETs.

Further provided is a smoothing and storage capacitor C2 connected between the output 5 of the converter and ground.

In addition to this a comparator 6 is provided which receives at one input a reference voltage Vref and at the other input a voltage proportional to the output voltage of the converter Vout of the DC/DC converter, this proportional voltage being derived from a voltage divider formed by the resistors R1 and R2. The output 7 of the comparator 6 is connected to a control circuit 13 including an oscillator furnishing in charge pump operation the switching signals S1, S2*a*/S2*b*, S3 and S4 to the gate drivers of the charge pump selectors to select the switches so that in a charging phase of the charge pump the charge pump capacitor C1 is charged to the input voltage Vcc and in the discharge phase of the charge pump the charge pump capacitor C1 forms with the input voltage Vcc a series circuit which is connected to the output capacitor C2 so that the latter can be charged. The switch positions in the charging phase and discharge phase have already been discussed in the background description in conjunction with the circuit as described by Horowitz so that there is no need to detail this any further.

Unlike DC/DC converters hitherto having skip mode regulation the DC/DC converter in accordance with the invention comprises a regulator circuit 7 which is connected to the output of the comparator 6. The regulator circuit 7 serves to maintain the ratio of the ON duration ton to the OFF duration toff of the charge pump constant independent of the working conditions (such as temperature, input voltage Vcc, transistor quality (slope etc,)) of the charge pump. It comprises two current sources 8 and 9 connected in series between the output voltage Vout and ground, these current sources being set to a first current I1 and a second current I2 respectively. In this arrangement each of the current sources is switched ON/OFF via a controllable switch (not shown). The two switches are controlled by the control signal of the comparator 6 which is either inverted by the inverter 10 or not inverted. The current sources 8 and 9 may comprise e.g. switchable MOS current mirrors as described e.g. in German patent DE 42 01 155. The connecting point of the two current sources 8 and 9 is connected via a stabilizing resistor 3 to one electrode of a capacitor C3, the other electrode of which is connected to ground. R3 and C3 form a low-pass filter. The connecting point 12 between the resistor R3 and the current sources 8 and 9 is connected to the gate of an N-type depletion mode MOSFET M the source/drain circuit of which is connected between the output voltage and an input terminal of the supply voltage of the gate driver 2 of the MOSFET switch S2*a* of the charge pump. The other input terminal of the supply voltage of the gate driver 2 is applied to ground.

The regulator circuit 4 receives the output signal of the skip mode regulator comparator 6 coming from output 7, the output signal comprising a first signal amplitude when the actual output voltage Vout at the output 5 of the DC/DC converter is less than a predetermined design value to which the converter is regulated and a second signal amplitude which differs from the first signal amplitude when the actual output voltage Vout at the output 5 of the DC/DC converter exceeds the design value. In the preferred embodiment the first signal level is HI and the second signal level is LO. When the level of the control signal of the comparator 7 changes from LO to HI the control circuit 8 receiving the control signal of the comparator 7, signals the charge pump ON. When the level of the control signal of the comparator 7 changes from HI to LO the control circuit 8 signals the charge pump OFF. Accordingly, a HI level (first level) of the control signal of the comparator characterizes the ON duration ton of the charge pump and a LO (second level) thereof characterizes the OFF duration toff of the charge pump.

The way in which the DC/DC converter in accordance with the invention works will now be described. The converter works like converters hitherto also in the skip mode which is controlled by the comparator 6, except that now the control signal of the comparator is sent not only to the control circuit 8, which activates or deactivates the charge pump as a function of the output voltage Vout of the converter, but also to the regulator circuit 4.

The regulator circuit 4 changes the ON resistance of the switch S2*a* so that the ratio of the OFF time toff to the ON time ton of the charge pump remains constant when the converter is operated under load conditions, the desired predetermined ratio of ton to toff being set by suitably selecting the currents I1 and I2 as detained below.

When the control signal of the comparator 6 is HI, i.e. symbolizing the ON duration ton of the charge pump, the second current source 9 is signalled ON via the gate of the switch (not shown), and when the control signal of the comparator 6 is LO, i.e. symbolizing the OFF duration toff of the charge pump, the first current source 8 is signalled ON via the gate of the switch (not shown) of the first current source 8, i.e. a different voltage appearing across the capacitor C3 depending on the ratio of the current I1 of the first current source 8 to the current I2 of the second current source 9. In this arrangement the voltage across the capacitor C3 and thus also the voltage at the gate terminal of the N-type MOSFET switch M is proportional to the momentary ratio of the ON duration ton to the OFF duration toff of the charge pump of the converter.

If the OFF duration toff of the charge pump increases, then the gate/source voltage of the MOSFET switch M serving decoupling drops and the ON resistance of M increases. The gate driver of the MOSFET switch S2*a* is then furnished a smaller supply voltage, this being the reason why the gate/source voltage of the N-type MOSFET switch S2*a* drops so that the ON resistance of the N-type MOSFET switch S2*a* increases. This means, however, that as compared to before less current is furnished by the charge pump in the same time which forces the skip mode comparator 6 when assuming a constant load to reduce the OFF duration toff of the charge pump and to increase the ON duration ton of the charge pump to maintain the output voltage Vout at the desired design value.

If the ON duration ton of the charge pump increases, then the gate/source voltage of the MOSFET switch M increases and the ON resistance of M decreases. The gate driver of the MOSFET switch S2*a* is then furnished a larger supply voltage, this being the reason why the gate/source voltage of the N-type MOSFET switch S2*a* increases so that the ON resistance of the N-type MOSFET switch S2*a* decreases. This means, however, that as compared to before more current is furnished by the charge pump in the same time which forces the skip mode comparator 6 when assuming a constant load to increase the OFF duration toff of the charge pump and to decrease the ON duration ton of the charge pump.

It is in this way that the regulator circuit 7 thus counteracts any changes in the OFF duration toff or ON duration ton to stabilize the ratio of the ON duration ton to the OFF duration toff of the charge pump independent of the working conditions of the converter (such as temperature, transistor quality, input voltage Vcc, load) to a predetermined value set by suitably selecting the currents I1 and I2 of the current sources 8 and 9 respectively. The higher I1 and the lower I2 is selected the greater the ratio of the ON duration ton of the charge pump to the OFF duration. In this arrangement the ON/OFF duration ratio ton/toff is set so that, on the one hand, the output current spikes of the charge pump are sufficiently diminished and, on the other hand, that an adequate dynamic range of the charge pump remains assured. A typical value for the ratio ton/toff would be e.g. 7/3, the current spikes then being diminished in accordance with the above formula (1) to (20/7)*Iload.

When very low load currents are involved, resulting in the skip mode regulator signalling the charge pump ON only now and again, the regulator circuit 7 is deactivated so that in this case too, a small idle current of the charge pump can be assured. Since the OFF time toff of the charge pump in this case as "seen" by the regulator circuit 7 is practically infinitely long, the regulator circuit will set the ON resistance of the switch S2a so high that the current is able to flow only via the small MOSFET switch S2b which is non-regulated and connected in parallel to the MOSFET switch S2a, the small MOSFET switch S2b being controlled by means of the control circuit 8 by the same control signal as the switch S2a.

Figure 4:
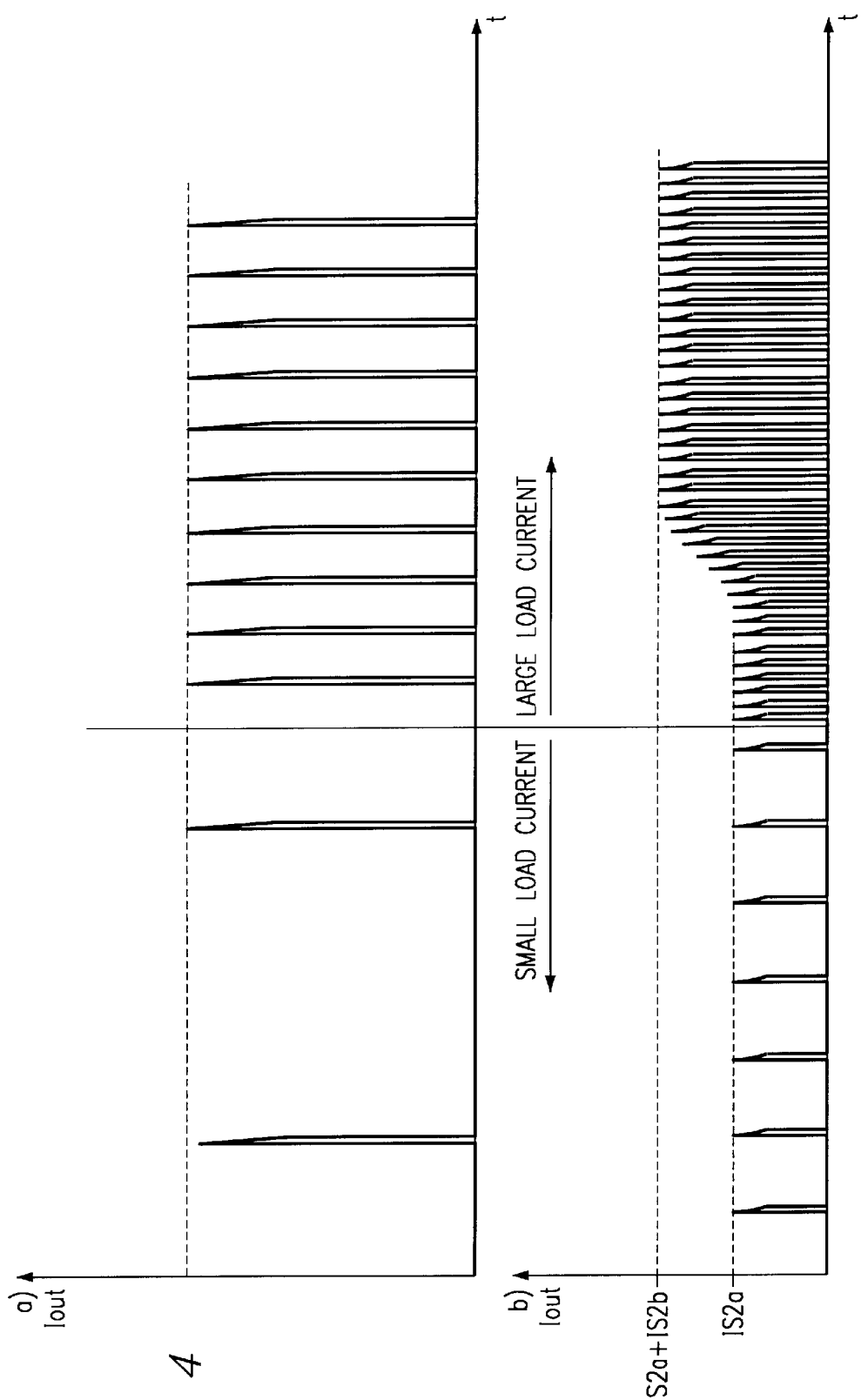

This is the situation as illustrated in FIG. 4, depicting the output current Iout of the charge pump for a prior art DC/DC converter (FIG. 4a) and for a DC/DC converter in accordance with the invention (FIG. 4b), whereby the portion of the Figure on the left relates to the case of a low load current and the portion of the Fig. on the right relates to the case of a higher load current. It will be noted that the current spikes occurring in the converter in accordance with the invention as shown in FIG. 4b are substantially smaller than the current spikes of the conventional converter as shown in FIG. 4a. In this arrangement the drawings are not true to scale but are merely intended to illustrate the principle profile of the output currents of the charge pump. The ripple too, of the output voltage in the converter in accordance with the invention is greatly reduced due to the reduced amplitude of the current spikes as compared to prior art converters. Also evident from FIG. 4b is that the amplitude of the current spikes for a low load is dictated by the current IS2b through the MOSFET switch S2b. When the load increases at the output of the converter the current furnished by the charge pump increases after a predetermined settling time to a current resulting from the sum of the currents through the regulated MOSFET switch S2a and the non-regulated MOSFET switch S2b. In this arrangement the ON/OFF duration ratio of the charge pump is constant as is evident from the constant spacing between the pulses. The charging phases and the discharge phases of the charge pump are not shown in FIG. 4—unlike the situation in FIG. 2—whereby the individual pulses as shown in FIG. 4 may involve one or more discharge and charging phases.

The person skilled in the art will readily appreciate the important thing in achieving the principle in accordance with the invention is not the precise configuration of the charge pump which may incorporate one or more charge pump capacitors or any number of controllable switches connected thereto. The charge pump may increase, decrease or invert the voltage. Indeed, the configuration of the regulator circuit 7 as shown is also to be appreciated merely as being an example, since any circuit is suitable for this purpose which converts the control signal of the comparator into a signal characterizing the ON/OFF duration ratio of the charge pump with which it controls the ON resistance of at least one of the switches so that the ON/OFF duration ratio of the charge pump can be set to a predetermined design value.

What is claimed is:

1. A DC/DC converter operating on the principle of a charge pump, comprising
   at least one charge pump capacitor and a plurality of controllable switches connected thereto which are actuated during charge pump operation by a control circuit with an oscillator to generate across a storage capacitor applied to the output of the converter an output voltage deviating from the input voltage of the converter;
   and a comparator which compares a reference voltage to a voltage proportional to said output voltage of the converter and outputs a control signal for said control circuit, said control signal being at a first level when said output voltage drops below a predetermined design value and being at a second level when said output voltage exceeds said design value, said control circuit signalling said charge pump ON when said control signal changes from said second to said first level and signalling said charge pump OFF when said control signal changes from said first to said second level;
   a regulator circuit receiving said control signal of said comparator and converting it into a signal related to the momentary ON/OFF duration ratio of said charge pump with which it controls said ON resistance of one of said plurality of switches so that said ON/OFF duration ratio of said charge pump can be regulated to a predetermined design value,
   and a second controllable switch connected in parallel with said one switch whose ON resistance is controlled and which is controlled by said control circuit correspondingly thereto.

2. The DC/DC converter as set forth in claim 1 wherein said converter comprises an integrated circuit.

3. The DC/DC converter as set forth in claim 1 wherein said switches are MOSFETs.

4. The DC/DC converter as set forth in claim 2 wherein said second switch, as compared to said switch whose ON resistance is controlled, comprises only a small circuit surface area and a large ON resistance.

5. The DC/DC converter as set forth in claim 1 wherein said regulator circuit comprises connected in series between said output voltage and ground a first current source set to a predetermined first current and a second current source set to a predetermined second current, said first current source being signalled ON by a switch controlled by said control signal when said control signal has said second level and is signalled OFF when said control signal has said first level and said second current source is signalled ON by a third switch controlled by said control signal when said control signal has said first level and is signalled OFF when said control signal has said second level, and comprising a capacitor connected between the connecting point of said two current sources and ground, the voltage resulting across said capacitor being proportional to said ON/OFF duration ratio of said charge pump.

6. The DC/DC converter as set forth in claim 5 wherein said predetermined design value of said ON/OFF duration ratio is set by said first current and said second current.

7. The DC/DC converter as set forth in claim 3 wherein said voltage across said capacitor is applied to the gate of a MOSFET switch whose source/drain circuit is connected between said output voltage and said supply voltage of a gate driver connected to said gate of said MOSFET switch whose ON resistance is controlled by said circuit.

8. The DC/DC converter as set forth in claim 3 wherein said switched current sources are achieved by switchable MOS current mirrors.

9. The DC/DC converter as set forth in claim 2 wherein said switches are MOSFETs.

10. The DC/DC converter as set forth in claim 3 wherein said second switch, as compared to said switch whose ON resistance is controlled, comprises only a small circuit surface area and a large ON resistance.

11. The DC/DC converter as set forth in claim 2 wherein said regulator circuit comprises connected in series between said output voltage and ground a first current source set to a predetermined first current and a second current source set to a predetermined second current, said first current source being signalled ON by a switch controlled by said control signal when said control signal has said second level and is signalled OFF when said control signal has said first level and said second current source is signalled ON by a third switch controlled by said control signal when said control signal has said first level and is signalled OFF when said control signal has said second level, and comprising a capacitor connected between the connecting point of said two current sources and ground, the voltage resulting across said capacitor being proportional to said ON/OFF duration ratio of said charge pump.

12. The DC/DC converter as set forth in claim 3 wherein said regulator circuit comprises connected in series between said output voltage and ground a first current source set to a predetermined first current and a second current source set to a predetermined second current, said first current source being signalled ON by a switch controlled by said control signal when said control signal has said second level and is signalled OFF when said control signal has said first level and said second current source is signalled ON by a third switch controlled by said control signal when said control signal has said first level and is signalled OFF when said control signal has said second level, and comprising a capacitor connected between the connecting point of said two current sources and ground, the voltage resulting across said capacitor being proportional to said ON/OFF duration ratio of said charge pump.

13. The DC/DC converter as set forth in claim 4 wherein said regulator circuit comprises connected in series between said output voltage and ground a first current source set to a predetermined first current and a second current source set to a predetermined second current, said first current source being signalled ON by a switch controlled by said control signal when said control signal has said second level and is signalled OFF when said control signal has said first level and said second current source is signalled ON by a third switch controlled by said control signal when said control signal has said first level and is signalled OFF when said control signal has said second level, and comprising a capacitor connected between the connecting point of said two current sources and ground, the voltage resulting across said capacitor being proportional to said ON/OFF duration ratio of said charge pump.

14. The DC/DC converter as set forth in claim 5 wherein said voltage across said capacitor is applied to the gate of a MOSFET switch whose source/drain circuit is connected between said output voltage and said supply voltage of a gate driver connected to said gate of said MOSFET switch whose ON resistance is controlled by said circuit.

15. The DC/DC converter as set forth in claim 6 wherein said voltage across said capacitor is applied to the gate of a MOSFET switch whose source/drain circuit is connected between said output voltage and said supply voltage of a gate driver connected to said gate of said MOSFET switch whose ON resistance is controlled by said circuit.

16. The DC/DC converter as set forth in claim 5 wherein said switched current sources are achieved by switchable MOS current mirrors.

17. The DC/DC converter as set forth in claim 6 wherein said switched current sources are achieved by switchable MOS current mirrors.

18. The DC/DC converter as set forth in claim 7 wherein said switched current sources are achieved by switchable MOS current mirrors.

* * * * *